(12) United States Patent
Brevard

(10) Patent No.: US 11,733,120 B2
(45) Date of Patent: Aug. 22, 2023

(54) APPARATUS AND METHODS FOR TESTING THE INTEGRITY OF CONTAINMENT SUMPS

(71) Applicant: Daniel W. Brevard, Pollok, TX (US)

(72) Inventor: Daniel W. Brevard, Pollok, TX (US)

( * ) Notice: Subject to any disclaimer, the term of this patent is extended or adjusted under 35 U.S.C. 154(b) by 0 days.

(21) Appl. No.: 17/690,818

(22) Filed: Mar. 9, 2022

(65) Prior Publication Data

US 2022/0196511 A1 Jun. 23, 2022

Related U.S. Application Data

(62) Division of application No. 15/993,794, filed on May 31, 2018, now Pat. No. 11,274,987.

(60) Provisional application No. 62/522,795, filed on Jun. 21, 2017.

(51) Int. Cl.
| | |
|---|---|
| *G01M 3/20* | (2006.01) |
| *G01M 3/22* | (2006.01) |
| *G01M 3/04* | (2006.01) |
| G01M 3/28 | (2006.01) |
| B67D 7/32 | (2010.01) |

(52) U.S. Cl.
CPC .............. *G01M 3/226* (2013.01); *G01M 3/04* (2013.01); *G01M 3/20* (2013.01); *B67D 7/3209* (2013.01); *G01M 3/2892* (2013.01)

(58) Field of Classification Search
CPC ........ G01M 3/20; G01M 3/202; G01M 3/205; G01M 3/22; G01M 3/221; G01M 3/222; G01M 3/223; G01M 3/224; G01M 3/225; G01M 3/226; G01M 3/227; G01M 3/228; G01M 3/229; G01M 3/2892; G01M 3/30
See application file for complete search history.

(56) References Cited

U.S. PATENT DOCUMENTS

| | | | | |
|---|---|---|---|---|
| 4,725,551 A | * | 2/1988 | Thompson | .............. G01M 3/20 |
| | | | | 73/40.7 |
| 2004/0234338 A1 | * | 11/2004 | Monroe | ............... B67D 7/3218 |
| | | | | 405/52 |
| 2009/0113995 A1 | * | 5/2009 | Golding | ................ G01M 3/229 |
| | | | | 73/40.7 |

* cited by examiner

*Primary Examiner* — Herbert K Roberts
(74) *Attorney, Agent, or Firm* — Bochner PLLC; Andrew D. Bochner

(57) ABSTRACT

Methods for testing the integrity of a containment sump in contact with a matrix with a testing apparatus are provided. The testing apparatus may include an underground fixture positioned in contact the matrix, a test chamber, a conduit structure providing fluid communication between the underground fixture and the test chamber, and a pressure source for exerting a pressure that is communicated to the underground fixture via the conduit structure. In some embodiments, a method may include: releasing a test media into the containment sump; generating a negative pressure within the testing apparatus for a time period; and testing for the presence of test media within the testing apparatus. In other embodiments, a method may include: releasing a test media into the testing apparatus; generating a positive pressure within the testing apparatus for a time period; and testing for the presence of test media within the containment sump.

9 Claims, 8 Drawing Sheets

APPARATUS AND METHODS FOR TESTING THE INTEGRITY OF CONTAINMENT SUMPS

CROSS REFERENCE TO RELATED APPLICATIONS

This application claims priority to and the benefit of the filing date of U.S. Provisional Application No. 62/522,795, filed on Jun. 21, 2017, entitled "APPARATUS AND METHODS FOR TESTING THE INTEGRITY OF CONTAINMENT SUMPS", which is hereby incorporated by reference in its entirety.

FIELD OF THE INVENTION

This patent specification relates to the field of apparatuses and methods for testing the integrity of storage tanks, piping, and ancillary equipment. More specifically, this patent specification relates to apparatuses and methods for testing the integrity of containment sumps that are associated with catching releases of materials released from storage of materials in the tanks, piping and filling or removing materials from the storage tanks, piping and ancillary equipment.

BACKGROUND

Underground storage tanks (USTs) that contain a wide variety of materials, including regulated liquids such as gasoline, aviation fuel, diesel and other types of regulated liquids, are required under federal and state regulations to provide various compliance documentation and periodic tests. One of these requirements is that tanks and piping installed after Apr. 11, 2016 must have secondary containment and interstitial monitoring. Further, secondary containment sumps for dispensers, submersible turbine pumps, transition and spill are required to be tested for integrity at least once every three years. Furthermore, some containment sumps must be tested for integrity annually.

The only current acceptable method to test containment is filling the containment with a test liquid such as water. Typically, a volume of water is placed in the containment above any bottom and side penetrations, measured and then remeasured after a calculated period of time. If there is no loss of the test liquid, then the containment system is determined to have passed the integrity test. However, the water testing fluid is considered contaminated since it was placed in a containment vessel used to catch releases of liquids such as gasoline or diesel fuel. Thus, the water testing fluid must be disposed of in an environmentally safe manner. Currently, the EPA states that there are approximately 223,157 UST facilities in the United States and each facility averages three USTs and four dispenser islands. The annual testing of spill bucket containment would require the disposal of approximately 4,463,140 gallons of water annually at a cost of approximately $89,262,800.00. Additionally, and based on current EPA Regulatory Costs, the three-year integrity testing of underground storage tank and dispenser containment sumps would require the disposal of approximately 7,810,495 gallons of water annually at a cost of approximately $156,209,900.00.

Therefore, a need exists for a novel apparatuses and methods for testing the integrity of storage tanks, piping, and ancillary equipment. A further need exists for novel apparatuses and methods for testing the integrity of storage tanks, piping, and ancillary equipment which reduce the amount of testing fluid and must be disposed of in an environmentally safe manner. Finally, a need exists for novel apparatuses and methods for testing the integrity of containment sumps that are associated with catching releases of materials released from storage of materials in the tanks, piping and filling or removing materials from the storage tanks, piping and ancillary equipment.

BRIEF SUMMARY OF THE INVENTION

An apparatus and methods for testing the integrity of containment sumps are provided. The apparatus and methods are intended to meet the ongoing need for integrity testing and can test containment sumps that have piping or other equipment that penetrates through the side walls and bottom through tight-sealed openings. The apparatus and methods can also test sumps with piping and equipment placed into the open top of the sump which would not allow for any lid or fixture to be placed on top of the sump for tightness testing. The apparatus and methods allow test media comprising heavier than air gases and/or vapors to be introduced with negative or positive pressure, either to the interior or exterior of the containment sump space, and then measured on the opposite interior or exterior to see if the test media has passed through the side walls, bottoms, or sealed penetrations of the containment sump to determine the integrity of the containment sump.

In some embodiments, an apparatus for testing the integrity of containment sumps may include an underground fixture configured to be positioned underground proximate to a containment sump. A conduit structure may be coupled to the underground fixture, and the conduit structure may have a first conduit and second conduit coupled in parallel to a third conduit and to a fourth conduit with the underground fixture coupled to the third conduit and with one or more valves governing fluid communication through the conduits of the conduit structure. A test chamber may be coupled to the fourth conduit, and the test chamber may have one or more valves. A pressure source for exerting a pressure within the conduit structure for motivating a test media between the containment sump and the underground fixture may be coupled to the fourth conduit via the test chamber or via a connector on the fourth conduit.

According to another embodiment consistent with the principles of the invention, a method for testing the integrity of a containment sump in contact with a matrix using negative pressure via an apparatus for testing the integrity of containment sumps is provided. The testing apparatus may include an underground fixture positioned in contact with the matrix, a test chamber, a conduit structure providing fluid communication between the underground fixture and the test chamber, and a pressure source for exerting a pressure that is communicated to the underground fixture via the conduit structure. The method may include: releasing a test media into the containment sump; generating a negative pressure within the testing apparatus for a time period; and testing for the presence of test media within the testing apparatus.

According to another embodiment consistent with the principles of the invention, a method for testing the integrity of a containment sump in contact with a matrix using positive pressure via an apparatus for testing the integrity of containment sumps is provided. The testing apparatus may include an underground fixture positioned in contact with the matrix, a test chamber, a conduit structure providing fluid communication between the underground fixture and the test chamber, and a pressure source for exerting a pressure that is communicated to the underground fixture via the conduit structure. The method may include: releasing a test media into the testing apparatus; generating a positive pressure within the testing apparatus for a time period; and testing for the presence of test media within the containment sump.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
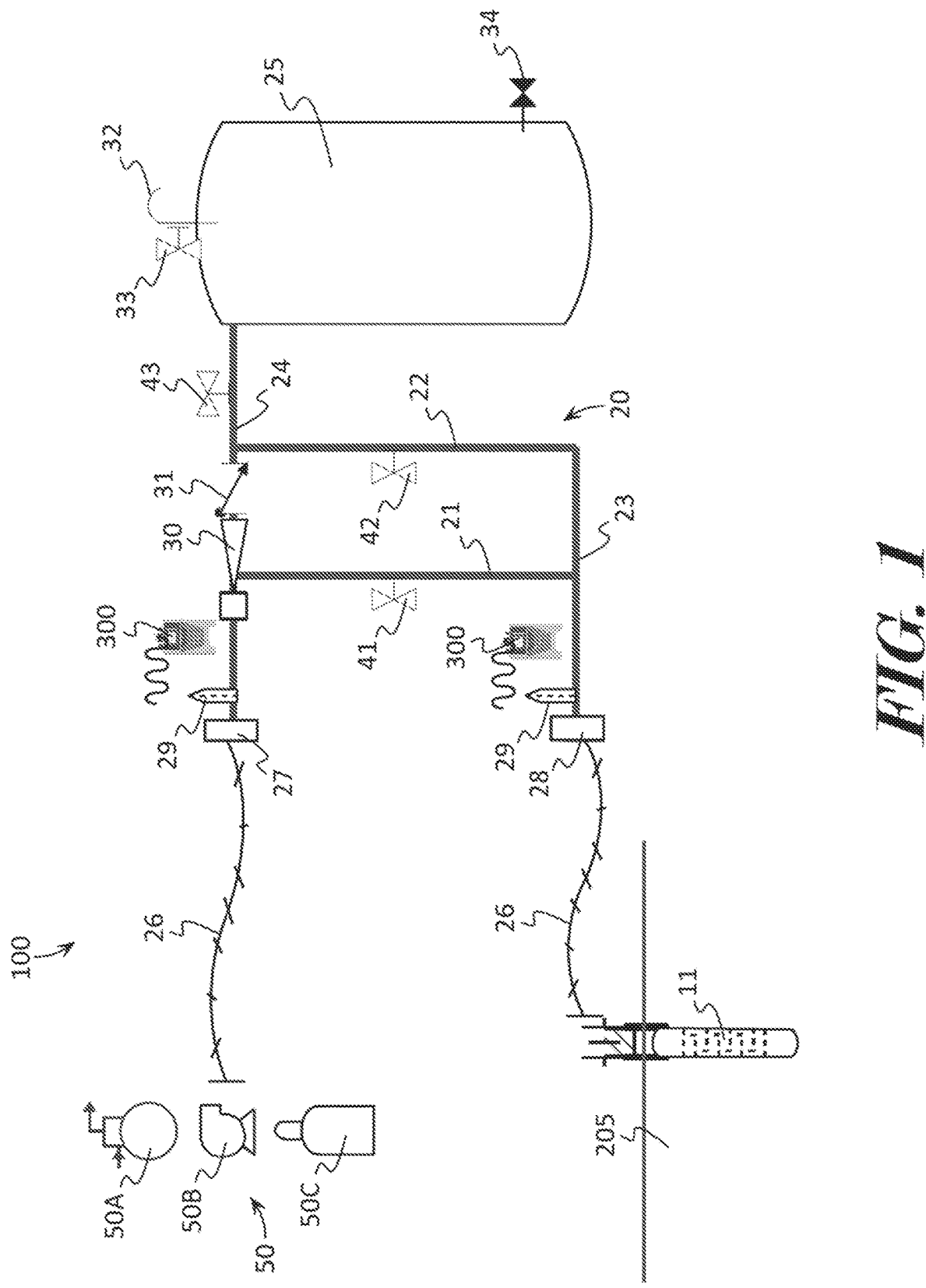
FIG. 1-FIG. 1 depicts a schematic diagram of an example of an apparatus for testing the integrity of containment sumps according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New apparatuses and methods for testing the integrity of storage tanks, piping, and ancillary equipment are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 6:
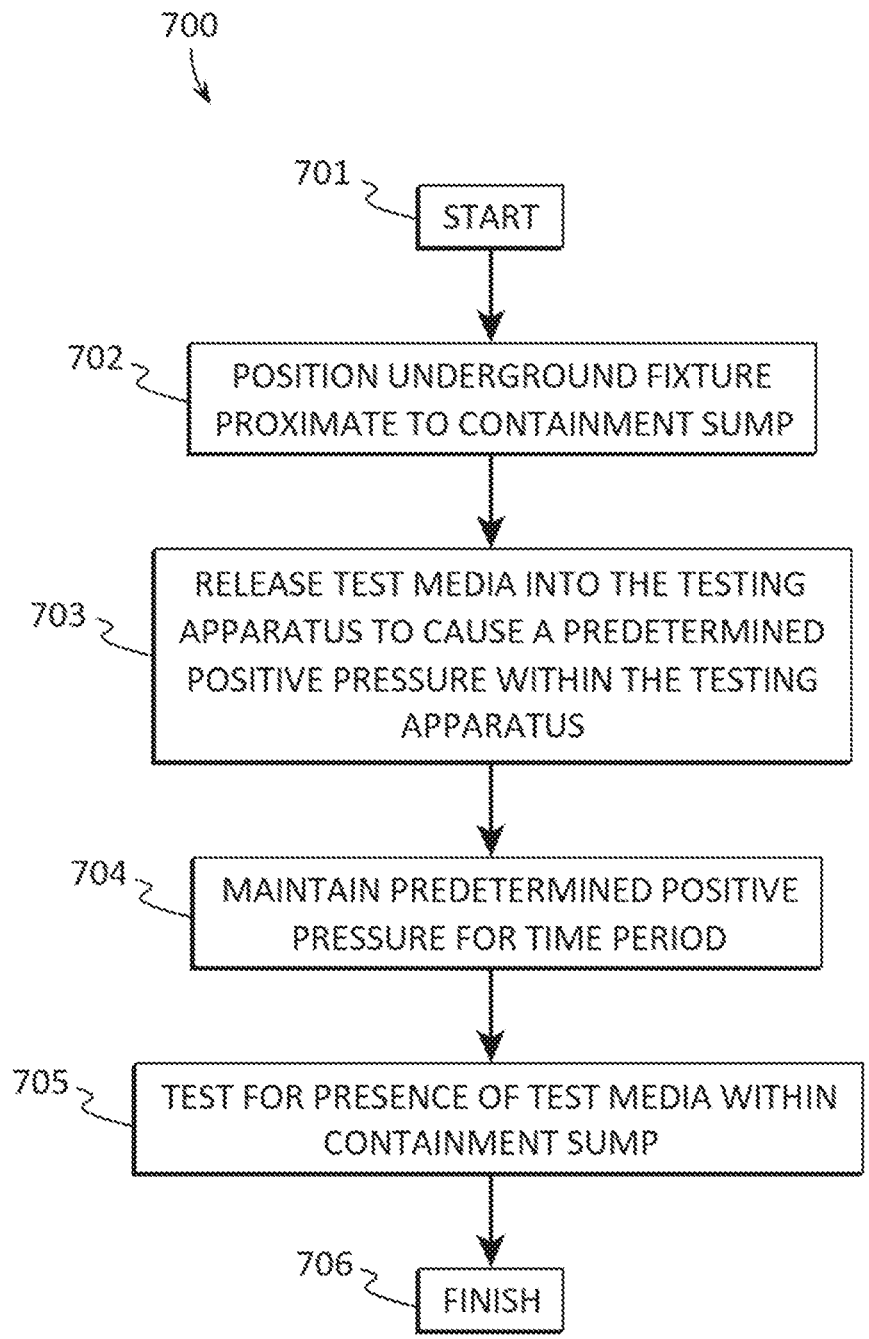
FIG. 6-FIG. 6 shows a block diagram of an example of a method for testing the integrity of containment sumps using positive pressure according to various embodiments described herein.
Figure 7:
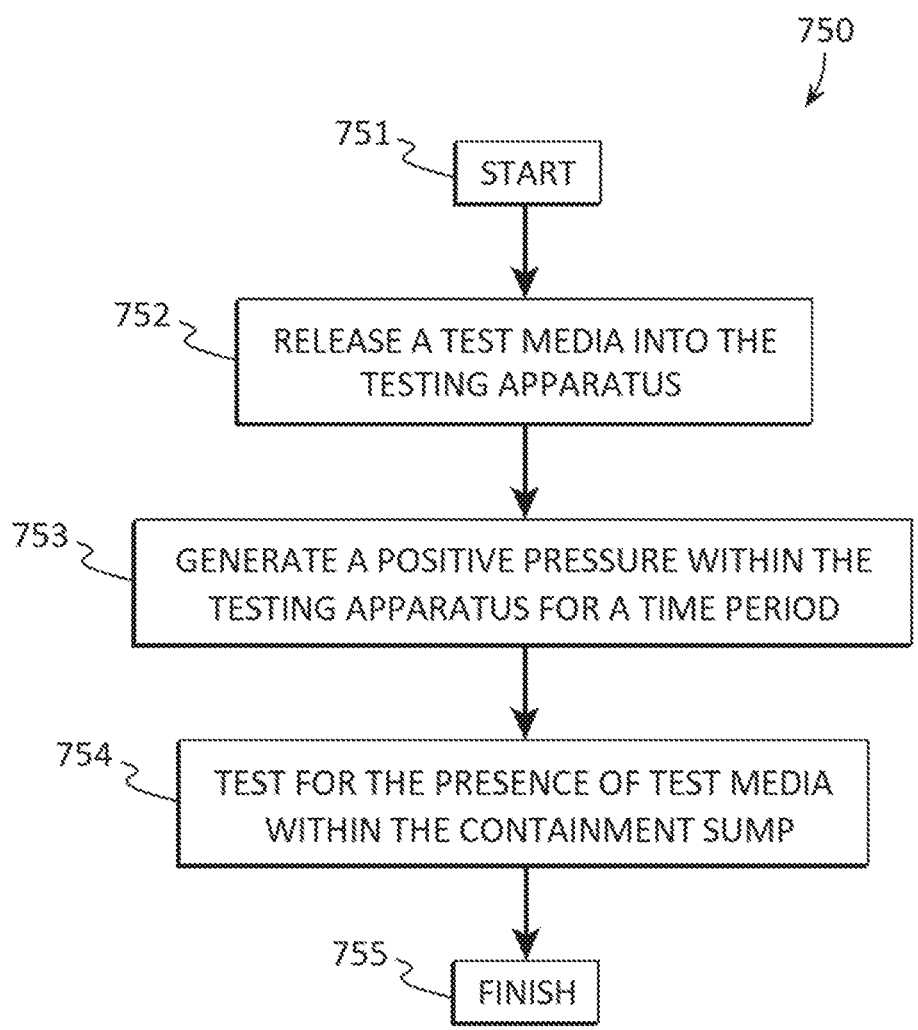
FIG. 7-FIG. 7 depicts a block diagram of an example of another method for testing the integrity of containment sumps using positive pressure according to various embodiments described herein.
Figure 8:
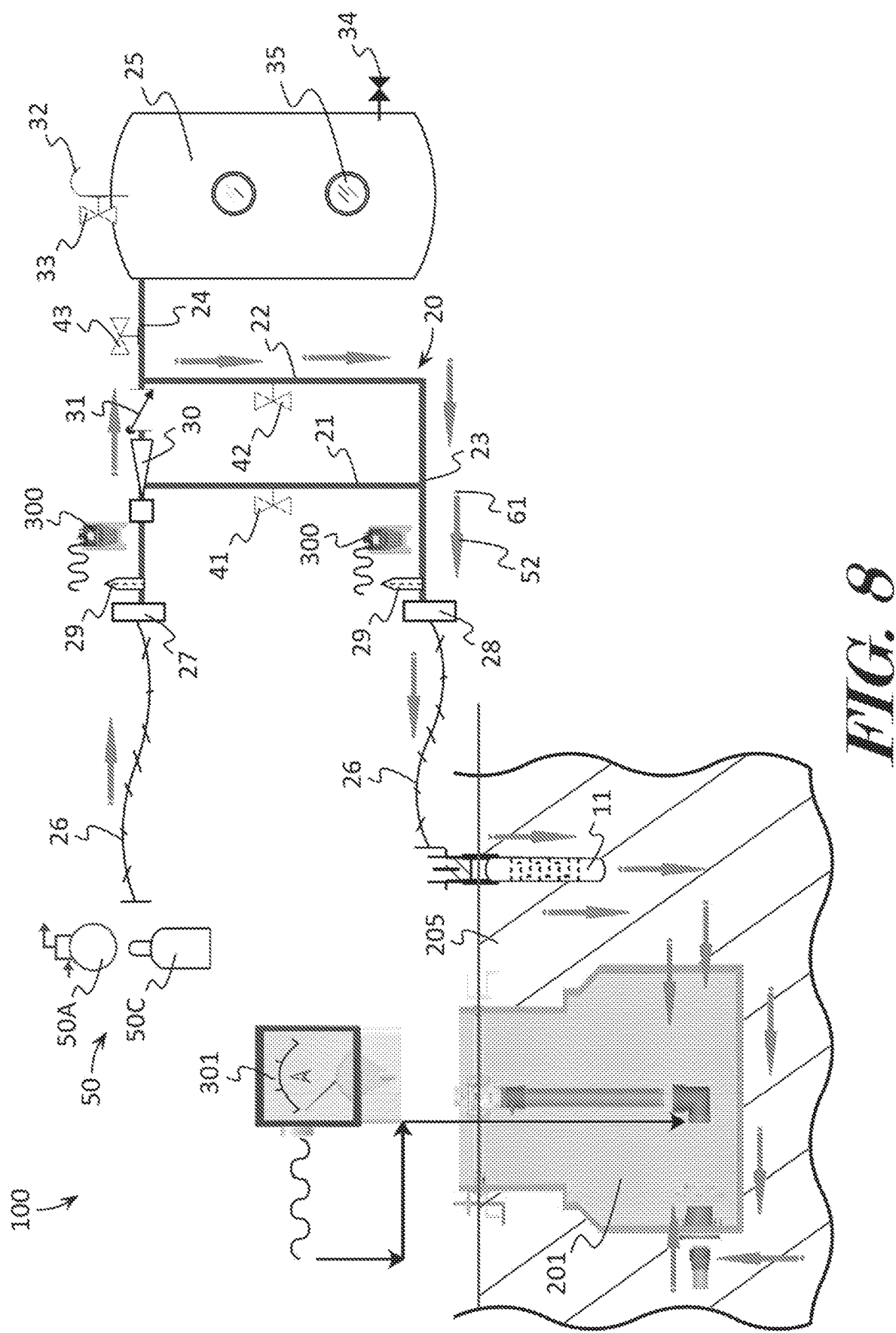
FIG. 8-FIG. 8 illustrates a schematic diagram of an example of an apparatus for testing the integrity of containment sumps using positive pressure according to various embodiments described herein.

The present invention will now be described by example and through referencing the appended figures representing preferred and alternative embodiments. FIG. 1 illustrates an example of an apparatus for testing the integrity of containment sumps ("the apparatus") 100 according to various embodiments. The testing apparatus 100 may comprise one or more underground fixtures, in this example, one underground fixture 11 is shown which may be coupled to a conduit structure 20. The conduit structure 20 may be coupled to a pressure source 50 which may be configured to generate positive 52 or negative pressure 51 within the testing apparatus 100. The underground fixture 11 may be positioned underground proximate to a containment sump 201. In some embodiments and as shown in FIGS. 2-5, the testing apparatus 100 may utilize negative pressure 51 to test the integrity of a containment sump 201. Test media 61 may be released within the containment sump 201 and the pressure source 50 may be configured to generate a predetermined negative pressure 51 within the testing apparatus 100. The negative pressure 51 may be maintained for a predetermined time period and then the presence of test media 61 within testing apparatus 100 may be tested for with a lack of test media 61 presence used to determine that the containment sump 201 has integrity. In other embodiments and as shown in FIGS. 6-8, the testing apparatus 100 may utilize positive pressure 52 to test the integrity of a containment sump 201. Test media 61 may be released within the conduit structure 20 and the pressure source 50 may be configured to generate a predetermined positive pressure 52 within the testing apparatus 100. The pressure source 50 may apply positive pressure 52 to the apparatus 100 to drive the test media 61 out of the ground fixture 11 and into the matrix 205 surrounding the containment sump 201. The positive pressure 52 may be maintained for a predetermined time period and then the presence of test media 61 within containment sump 201 may be tested for with a lack of test media 61 presence used to determine that the containment sump 201 has integrity.

The testing apparatus 100 may use a test media 61 to test and determine the integrity of containment sumps 201, tanks, piping and filling or removing structures from storage tanks, piping, ancillary equipment, or any other structures for containing any type of regulated liquids which may be required under federal and state regulations to provide various compliance documentation and periodic tests. In preferred embodiments, a test media 61 may comprise one or more gases which may be heavier than air which may be used to test integrity and which may therefore eliminate the use and waste of valuable natural resources, such as water, for testing and the costs associated with proper disposal of the contaminated water. Example gas test media 61 includes, but is not limited to: argon, nitrogen, Xenon, Krypton, Carbon Dioxide, Sulfur Hexafluoride, Chlorofluorocarbons, Hydrochlorofluorocarbons, Hydrofluorocabons, Fluorocarbons, and certain Hydrocarbons, such as Naptha and light petroleum oils. In further preferred embodiments, a test media 61 may comprise one or more vapors. A vapor may comprise a substance diffused or suspended in the air or other gas, especially a substance that is normally liquid or solid. Example vapor test media 61 includes Glycerin, Glycol, Dipropylene Glycol, Propylene Glycol, mineral oils, Triethylene Glycol, Polyethylene Glycol, Monopropylene Glycol, Butylene Glycol, and surfactants.

An underground fixture 11 may be configured to perform the functions of an in-ground educator and/or an in-ground aspirator. An underground fixture 11 may comprise a plurality of apertures through which air, gasses, liquids, and test media 61 may freely pass through. Generally, all or portions of the underground fixture 11 may be positioned underground or in the matrix 205 surrounding a containment sump 201 so that test media 61 may pass into and/or out of the underground fixture 11 through the matrix surrounding a containment sump 201 while preventing the matrix from entering the testing apparatus 100. An exemplary underground fixture 11 may comprise ½" to 1" Sch 40 PVC with well screen style slots (or apertures of any other shape) and a sealed bottom cap with weep-hole. The top of the underground fixture 11 may be NPT threaded to accept quick disconnect coupling such as a quick style connector with permanent connection to one side and quick connect or disconnect to other with one side being male and one side being female. Manufacturers may include the following: KENT Systems (collection 3 type), Dixon fittings, Parker (series 02, series 25, PDP series), Cole-Parmer (CPC Series). These fit the ½", 1" and 1½" pipe sizes connections although other sizes and types may be used.

In some embodiments, an underground fixture 11 may be positioned in the matrix 205 (typically soil, pea gravel, or other fill) proximate to the containment sump 201 and preferably in close proximity to exterior walls of the containment sump 201. A matrix 205 may comprise any material which may generally surround or otherwise contact a containment sump 201. In other embodiments, an underground fixture 11 may be an integral part of the containment sump 201 so that an underground fixture 11 may be part of the manufacturing process of or integrally formed with the containment sump 201. In this case, an underground fixture 11 may comprise any device or method to introduce heavier than air gases and/or vapors via negative or positive pressure 52 and a method to connect to the underground fixture 11 to the conduit structure 20 of the testing apparatus 100.

The underground fixture 11 may be in fluid communication with a conduit structure 20 thereby allowing positive or negative pressure 51 generated by a pressure source 50 to be communicated between the underground fixture 11 and the pressure source 50. A conduit structure 20 may include one or more conduits, such as a first conduit 21, second conduit 22, third conduit 23, and fourth conduit 24. In preferred embodiments, an underground fixture 11 may be coupled to a third conduit 23 and a test chamber 25 may be coupled to a fourth conduit 24.

The conduit structure 20 and/or one or more conduits 21, 22, 23, 24, may be formed from any type of pipe or conduit, such as Poly Vinyl Chloride (PVC) pipe and fittings, Chlorinated Poly Vinyl Chloride (CPVC) pipe and fittings, cross-linked polyethylene (PEX) pipe and fittings, galvanized pipe and fittings, black pipe and fittings, polyethylene pipe and fittings, copper pipe and fittings, brass pipe and fittings, stainless steel or other steel alloy pipe and fittings, vinyl pipe and fittings, or any other type of pipe or conduit. Example may include one inch schedule 40 PVC or brass of one size smaller. Larger containment sump testing may require schedule 80 PVC in sizes from 1" to 1½" or brass schedule 40 type although other sizes and materials may be used.

The conduit structure 20 may include one or more connectors, such as an upper connector 27 and a lower connector 28, which may enable elements of the testing apparatus 100 to be removably coupled to the conduit structure 20. In some embodiments, an upper connector 27 may be used to removably couple a pressure source 50 to the fourth conduit 24 optionally via a hose, tubing, or other flexible conduit 26. In further embodiments, a lower connector 28 may be used to removably couple an underground fixture 11 to the third conduit 23 optionally via a hose, tubing, or other flexible conduit 26. In still further embodiments, connectors 27, 28, may comprise a quick style connector with permanent connection to one side and quick connect or disconnect to other with one side being male and one side being female. Example manufacturers may be from the following: KENT Systems (collection 3 type), Dixon fittings, Parker (series 02, series 25, PDP series), Cole-Parmer (CPC Series). These fit the ½", 1" and 1½" pipe sizes although other sizes may be used. Exemplary flexible conduit 26 may include tubing for 125 psi or better that may be flexible and which may be from poly, rubber, Polytetrafluoroethylene, or combination of materials.

The conduit structure 20 may include one or more connectors which may be configured to enable pressure reading instruments 300, such as manometers, pressure gauges, and the like, to be coupled to the conduit structure 20 at various locations. For example, the testing apparatus 100 may comprise a pressure reading connector 29 positioned on the fourth conduit 24 proximate to the upper connector 27 and a pressure reading connector 29 positioned on the third conduit 23 proximate to the lower connector 28. Example pressure reading connectors 29 include a quick style connector with permanent connection to one side and quick connect or disconnect to other with one side being male and one side being female. Manufacturers may be from the following: KENT Systems (collection 3 type), Dixon fittings, Parker (series 02, series 25, PDP series), Cole-Parmer (CPC Series). These fit the test port tubing sizes ⅛", ¼" and ⅜" sizes although other sizes may be used.

In some embodiments, the conduit structure 20 may include one or more test chambers 25 which may be configured to receive a volume of test media 61. A test chamber 25 may be configured in any size and shape. An exemplary test chamber 25 may comprise six to eight inch Schedule 80 PVC with solvent weld top and bottom and NPT threading on one or more inlets/outlets. In other embodiments, a test chamber 25 may comprise any suitable type of tank or containment vessel. In preferred embodiments, a test chamber 25 may comprise one or more viewing portals 35 which may allow a user to observe or look into the interior of the test chamber 25. A viewing portal 35 may comprise any suitable generally transparent material, such as borosilicate glass, which may allow visible light or other electromagnetic radiation to pass through which may be used to indicate the presence of test media 61 within the test chamber 25. For example, a laser, flash light, UV light source, or other light source that may illuminate on test media 61 may be directed into the test chamber 25 via a viewing portal 35 so that a user may visually determine if test media 61 is in the test chamber 25. In further embodiments, a test gas meter 301 may be in fluid communication with the test chamber 25. A test gas meter 301 may comprise any suitable device for detecting test media 61 such as the PGD2 Range of Portable Gas Detectors from Status Scientific Controls.

Optionally, a test chamber 25 may comprise a vent 32 having a vent valve 33 which may be used to allow gases and test media 61 to pass into and out of the test chamber 25. Example vent valves 33 include ½ inch lever style ball valves manufactured in PVC or Brass although other sizes and types may be used. Manufacturers may be from the following Lasco, Parker, etc. The vent valve 33 may be connected to the test chamber 25 and with a "U" vent 32. Optionally, a test chamber 25 may comprise a drain connector 34 which may function as a drain valve and comprise a vent valve 33 or the like and/or functions as a connector and comprise a connector 27, 28, or the like.

In some embodiments, a conduit structure 20 may comprise two conduits that may be coupled in parallel to each other. In further embodiments, the conduit structure 20 may comprise a first conduit 21 coupled to both a third conduit 23 and to a fourth conduit 24 and a second conduit 22 coupled to both the third conduit 23 and the fourth conduit 24, and the first conduit 21 and second conduit 22 may be coupled in parallel to each other to the third conduit 23 and fourth conduit 24. In preferred embodiments, a first conduit 21 and second conduit 22 may be coupled in parallel to each other to both a third conduit 23 and to a fourth conduit 24 with the underground fixture 11 coupled to the third conduit 23. The fourth conduit 24 may be coupled to a test chamber 25 and to a pressure source 50 via an upper connector 27 (FIGS. 1, 3, and 6) or via the test chamber 25 (FIG. 5).

The testing apparatus 100 may comprise a venturi 30 which may be configured as a venturi pump and which may be used to generate negative pressure 51 within the conduit structure 20. A venturi 30 may be in communication with a pressure source 50, and the pressure source 50 and venturi 30 may be configured to generate negative pressure 51 within the conduit structure 20 so that the negative pressure 51 may be communicated to the underground fixture 11 via the conduit structure 20. Optionally, a venturi 30 may be positioned at the junction of the first conduit 21 and fourth conduit 24. Example venturi 30 may include a venturi PVC Waterway 212-3450 and 210-3330 for most applications and they are 1½" by 2" by 1" and 1" by 1" by ¾". Larger devices 100 for containment sump testing may require more air flow which would require a larger tester using Waterway 212-3470 which is 1½" by 2" by 1" and doubles flow and volume. Another example venturi which may be used is the FOX 611210-060 brass which pulls approximately 3.7 SCFM @ 60 psig to minimum 25" Hg vacuum.

In some embodiments, the conduit structure 20 may comprise one or more check valves 31. Preferably, a check valve 31 may be positioned after the venturi 30 on the fourth conduit 24 to maintain the direction of fluid communication through the fourth conduit 24. Example check valves 31 may include a one inch PVC check valve, a one inch brass check valve, or any other size or material check valve such as provided by the manufacturers of Lasco, Parket, etc.

In some embodiments, the conduit structure 20 may include one or more valves, such as a first valve 41, second valve 42, and third valve 43, which may be used to direct fluid communication through the conduit structure 20 between one or more elements of the testing apparatus 100 In some embodiments, a first valve 41 may be positioned on the first conduit 21 to govern fluid communication of the first conduit 21, a second valve 42 may be positioned on the second conduit 22 to govern fluid communication of the second conduit 22, and a third valve 43 may be positioned on the fourth conduit 24 to govern fluid communication of the fourth conduit 24. Example valves 41, 42, 43, may include one inch PVC or brass check valves such as those manufactured by Lasco, Parker, etc., a ball valve, a gate valve, butterfly valve, diaphragm valve, globe valve, check valve, pressure balanced valve, locking valve, solenoid valve, or any other type of valve or controller which may be used to enable, disable, or otherwise govern fluid communication through one or more elements or components of the testing apparatus 100.

The testing apparatus 100 may be coupled to and/or may comprise one or more pressure sources 50 which may be configured to generate positive 52 and/or negative pressure 51 within the conduit structure 20 for a desired period of time. Example pressure sources 50 may include compressors 50A, vacuum pumps 50B, and compressed gas containers 50C. In some embodiments, a pressure source 50 may be in fluid communication with the conduit structure 20 and underground fixture 11 to attempt to motivate a test media 61 through the underground fixture 11 into a containment sump 201 or to motivate a test media 61 from the containment sump 201 and into the underground fixture 11. In further embodiments, a pressure source 50 may comprise a positive displacement pump such as a rotary vane pump, a diaphragm pump, a liquid ring pump, a piston pump, a scroll pump, a screw pump, a Wankel pump, an external vane pump, a roots blower or booster pump, a multistage roots pump, a Toepler pump, a lobe pump, or any other suitable positive displacement pump. In alternative embodiments, a pressure source 50 may comprise a momentum transfer pump, a regenerative pump, an entrapment pump, or any other type of pump which may be suitable for motivating a test media 61.

FIGS. 2-6 disclose methods of using and configuring the testing apparatus 100 to test the integrity of containment sumps 201, tanks, piping and filling or removing structures from storage tanks, piping, ancillary equipment, or any other structures for containing any type of regulated liquids which may be required under federal and state regulations to provide various compliance documentation and periodic tests using negative pressure 51. Preferably, one or more preparation steps may be completed before the testing apparatus 100 is used to perform integrity testing. These steps may include: installing one or more underground fixture(s) 11 or in the case of an integral underground fixture 11 that is manufactured into a new containment sump 201, into the soil, pea gravel, or other type of underground matrix 205 to the proper depth in relation to the containment sump; preparing the containment sump 201 for the test by following standard protocol for cleaning and prepping the containment sump 201 which includes removing liquid, debris and visually inspecting all penetration points and interior for cracks; and evacuating the containment sump 201 with clean air or nitrogen and check with test gas meter 301 to determine that no test media 61 is present before starting integrity testing.

Figure 2:
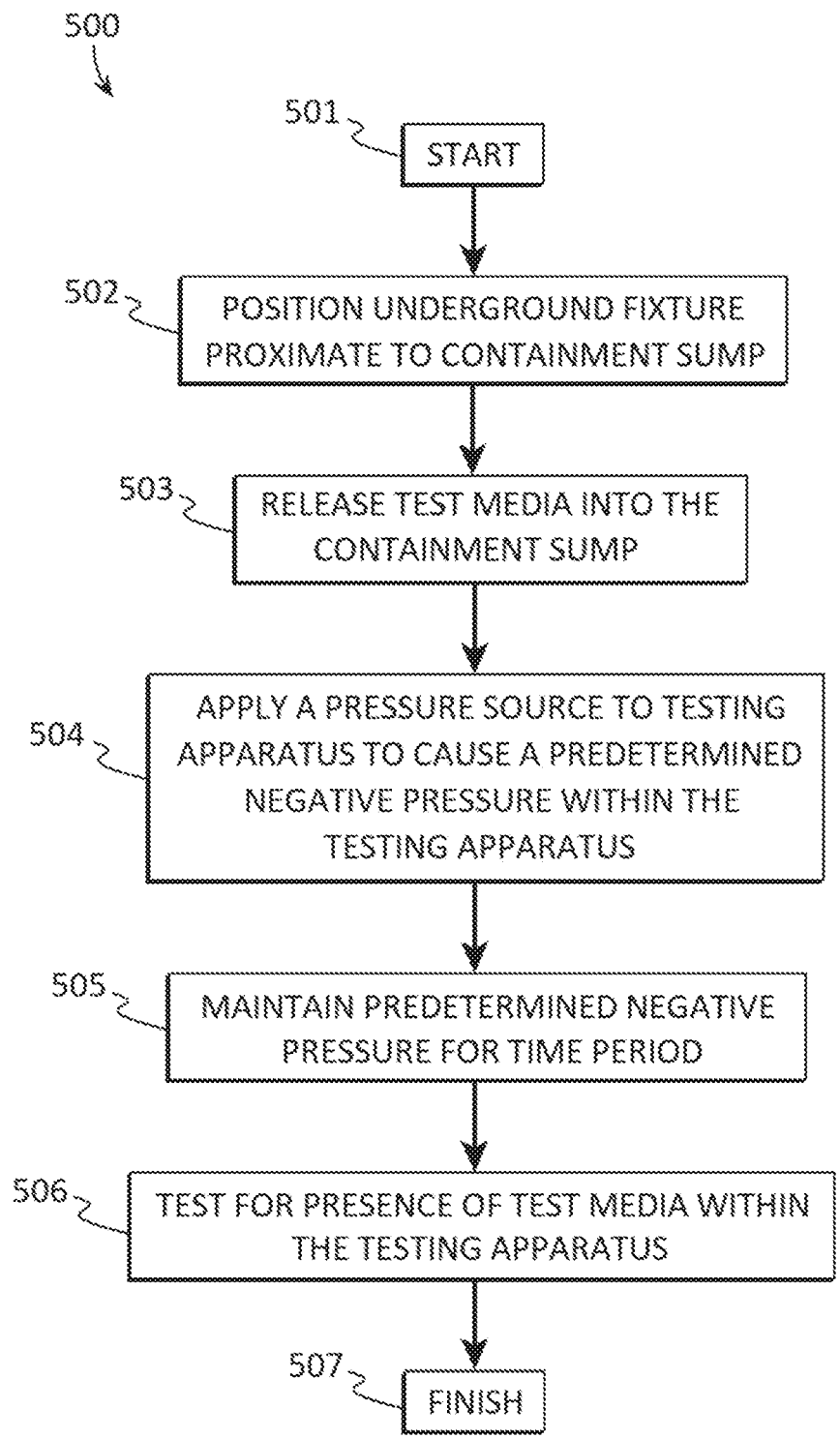
FIG. 2-FIG. 2 illustrates a block diagram of an example of a method for testing the integrity of containment sumps using negative pressure according to various embodiments described herein.
Figure 4:
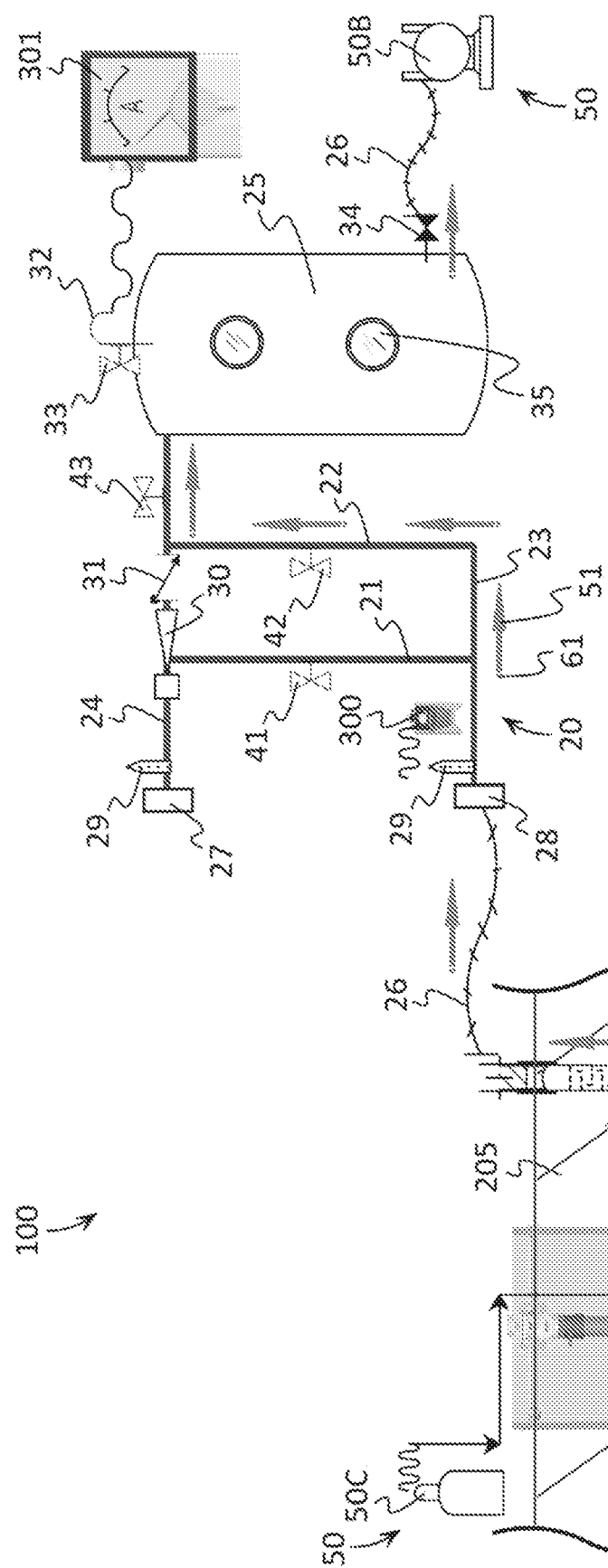
FIG. 4-FIG. 4 depicts a schematic diagram of an example of an apparatus for testing the integrity of containment sumps using negative pressure according to various embodiments described herein.
Figure 5:
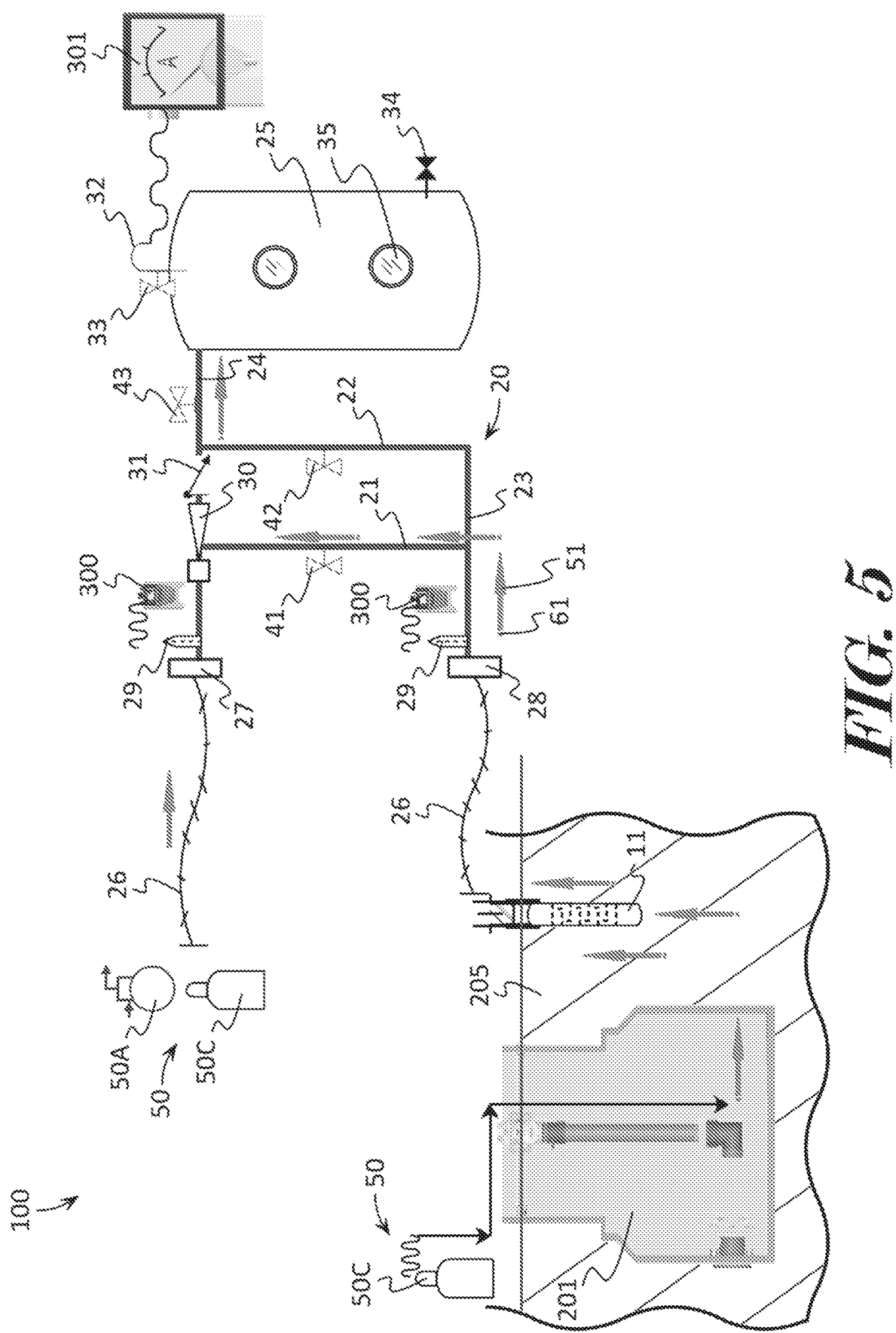
FIG. 5-FIG. 5 illustrates a schematic diagram of an alternative example of an apparatus for testing the integrity of containment sumps using negative pressure according to various embodiments described herein.

Referring to FIG. 2, an example of a method for testing the integrity of containment sumps using negative pressure ("the method") 500 using a testing apparatus 100 which may be configured as shown in FIGS. 4 and 5 according to various embodiments described herein is shown. In some embodiments, a pressure source 50, such as a compressor 50A (FIG. 5) or a compressed gas container 50C (FIG. 5), may provide or create negative pressure 51 which may be supplied to the fourth conduit 24 and used to motivate a test media 61 through a containment sump 201 (if the containment sump 201 has a leak) and into the underground fixture 11. In further embodiments, a pressure source 50, such as a vacuum pump 50B (FIG. 4), may provide or create negative pressure 51 which may be supplied to the fourth conduit 24 and used to motivate a test media 61 through a containment sump 201 (if the containment sump 201 has a leak) and into the underground fixture 11. If the test media 61 is detected from the containment sump 201, the containment sump 201 may be determined to not pass integrity testing. In further embodiments, the method 500 may comprise placing a heavier than air test media 61 inside the containment sump 201, preferably checked to insure the containment sump 201 is full of test media 61 above the bottom and side penetrations or to the top of the containment, and then a negative pressure 51 may be introduced through the testing apparatus 100 to see if any of the test media 61 accumulates in the testing apparatus 100 and measurable in the matrix 205 outside the containment sump 201. No measurable test media 61 indicates the containment sump 201 passes the integrity test.

The method 500 may start 501 and the underground fixture 11 may be positioned proximate to containment sump 201 in step 502. In some embodiments, the underground fixture 11 may be placed in matrix 205 (ex: soil, pea gravel) in close proximity, such as between 0.25 inches and ten inches, an exterior wall 202 of the containment sump 201. In alternative embodiments, the underground fixture 11 may be an integral part of the containment sump 201 that is formed into the containment sump 201 as part of the manufacturing process.

In step 503, test media 61 may be released into the containment sump 201. Preferably, the test media 61 may be released to fill the containment sump 201 above the bottom and side penetrations or to the top of the containment area. In some embodiments, step 503 may include determining which test media 61 to use and placing a test media 61 supply hose (attached to pressurized test media 61 storage bottle or compressed gas container 50C containing test media 61) into bottom of containment sump 201 that is being tested. The test media 61 may be slowly released from pressurized test gas bottle into the containment sump 201 until the test media 61 preferably fills the containment sump 201, such as by checking at the top of the containment sump 201 with test gas meter 301 or other leak detection monitor specifically calibrated to the test media 61 to determine when the containment sump 201 is "full" of the test media 61. Optionally, the containment sump 201 can be checked using soap bubbles that float on top of the test media 61. Optionally, the containment sump 201 can also be checked by floating a solid on top with a specific gravity less than the test media 61.

In step 504, a pressure source 50 may be applied to the testing apparatus 100 to cause a predetermined negative pressure 51, preferably and approximately between 15 to 30 Hg of vacuum, within the conduit structure 20 of the testing apparatus 100. The conduit structure 20 may be in fluid communication with the underground fixture 11 so that the negative pressure 51 may be communicated to the underground fixture 11. In some embodiments, the conduit structure 20 may be coupled to the underground fixture 11 via the lower connector 28 preferably using a flexible conduit 26 long enough to place the conduit structure 20 and/or test chamber 25 approximately ten to twenty feet (up-wind) from the containment sump 201 being tested. The test chamber 25 may be connected to the underground fixture 11 via the conduit structure 20 and the testing apparatus 100 prepared for the test. In some embodiments and as shown in FIG. 4, a pressure source 50, such as a vacuum pump 50B, may be coupled to a drain connector 34 or other suitable coupling, of the test chamber 25 and the first valve 41 may be closed, the second valve 42 may be open, and the third valve 43 may be open. Preferably, the vent valve 33 may be closed during negative pressure 51 application and open only for sample collection. In other embodiments and as shown in FIG. 5, a pressure source 50, such as a compressor 50A or compressed gas container 50C, may be coupled to the upper connector 27 and the first valve 41 may be open, the second valve 42 may be closed, and the third valve 43 may be open with the venturi 30 providing a negative pressure 51.

In step 505, the predetermined negative pressure 51 may be maintained for a desired time period. In some embodiments, the conduit structure 20 may be maintained at a negative pressure 51 long enough to displace the air in the matrix 205 surrounding the exterior of the containment sump 201 that is being tested through the conduit structure 20, preferably for minimum 5 minutes. If the containment sump 201 has a leak, test media 61 will be displaced with the air into the testing apparatus 100 via the underground fixture 11.

In step 506, the presence of test media 61 may be tested for within the testing apparatus 100. In some embodiments, the test media 61 may be tested for at the test chamber 25 vent 32 outlet with a test gas meter 301 or other leak detection monitor specifically calibrated to the test media 61 to determine the level of potential test media 61 within the test chamber 25. In some embodiments, if no test media 61 is detected, the containment sump 201 may be determined to have passed the integrity test. In further embodiments, if test media 61 is detected, the containment sump 201 may be determined to have failed the integrity test. In still further embodiments, if the containment sump 201 fails the test, restart from the preparation and begin the method 500 again. In alternative embodiments, if the containment sump 201 fails the test and if possible, restart from the preparation and perform a method for testing the integrity of containment sumps using positive pressure 700 and/or 800 (FIGS. 6-8). After step 506 the method 500 may finish 507.

Figure 3:
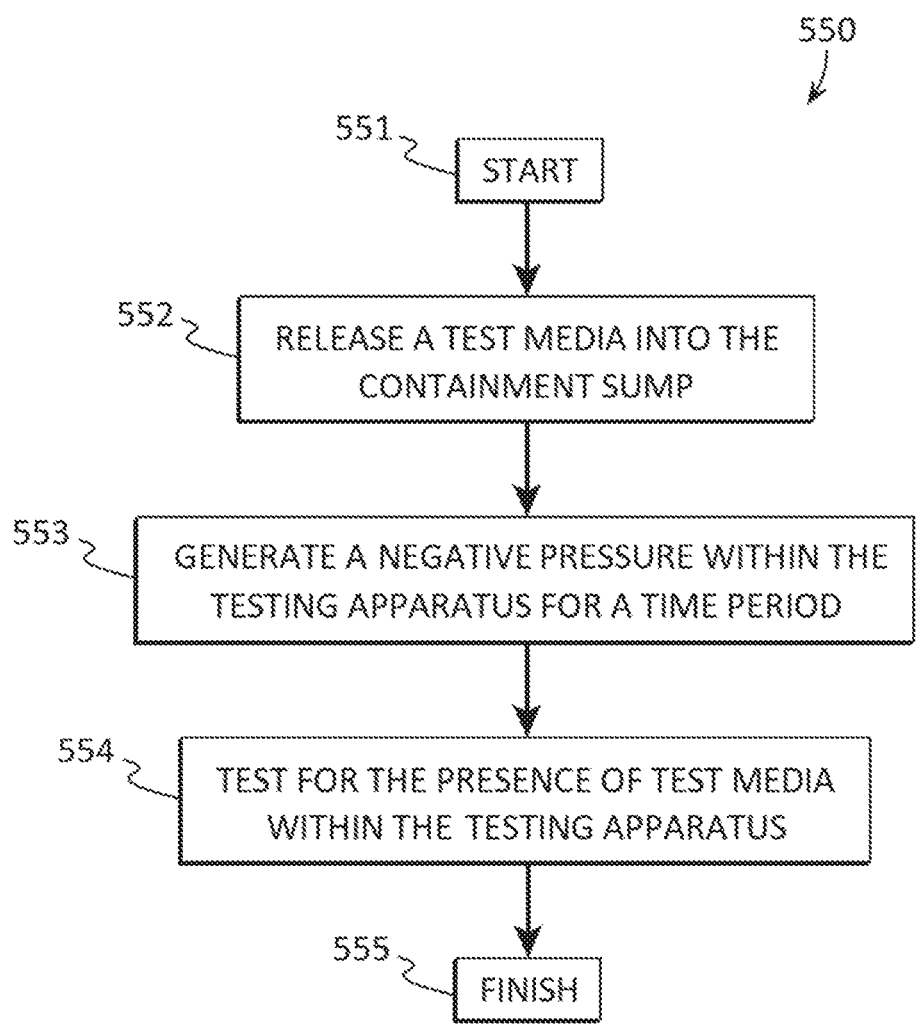
FIG. 3-FIG. 3 shows a block diagram of another example of a method for testing the integrity of containment sumps using negative pressure according to various embodiments described herein.

Referring to FIG. 3, an example of another method for testing the integrity of containment sumps using negative pressure ("the method") 550 using a testing apparatus 100 which may be configured as shown in FIGS. 4 and 5 according to various embodiments described herein is shown. The method 550 may be used for testing the integrity of a containment sump 201 that is in contact with a matrix 205 via a testing apparatus 100. The testing apparatus 100 may comprise an underground fixture 11 that may be positioned in contact the matrix 205, a test chamber 25, a conduit structure 20 providing fluid communication between the underground fixture 11 and the test chamber 25, and a pressure source 50 for exerting a negative pressure 51 that is communicated to the underground fixture 11 via the conduit structure 20.

In some embodiments, a pressure source 50, such as a compressor 50A (FIG. 5) or a compressed gas container 50C (FIG. 5), may provide or create negative pressure 51 which may be supplied to the fourth conduit 24 and used to motivate a test media 61 through a containment sump 201 (if the containment sump 201 has a leak) and into the underground fixture 11. In further embodiments, a pressure source 50, such as a vacuum pump 50B (FIG. 4), may provide or create negative pressure 51 which may be supplied to the fourth conduit 24 and used to motivate a test media 61 through a containment sump 201 (if the containment sump 201 has a leak) and into the underground fixture 11. In still further embodiments, a pressure source 50 may be coupled to the test chamber 25 and configured to generate a negative pressure 51 within the test chamber 25 that may be communicated to the underground fixture 11 via the conduit structure 20. If the test media 61 is detected from the containment sump 201, the containment sump 201 may be determined to not pass integrity testing. In further embodiments, the method 550 may comprise placing a heavier than air test media 61 inside the containment sump 201, preferably checked to insure the containment sump 201 is full of test media 61 above the bottom and side penetrations or to the top of the containment, and then a negative pressure 51 may be introduced through the testing apparatus 100 to see if any of the test media 61 accumulates in the testing apparatus 100 and measurable in the matrix 205 outside the containment sump 201. No measurable test media 61 indicates the containment sump 201 passes the integrity test.

The method 550 may start 551 and test media 61 may be released into the containment sump 201 in step 552. Preferably, the test media 61 may be released to fill the containment sump 201 above the bottom and side penetrations or to the top of the containment area. In some embodiments, step 552 may include determining which test media 61 to use and placing a test media 61 supply hose (attached to pressurized test media 61 storage bottle or compressed gas container 50C containing test media 61) into bottom of containment sump 201 that is being tested. The test media 61 may be slowly released from pressurized test gas bottle into the containment sump 201 until the test media 61 preferably fills the containment sump 201, such as by checking at the top of the containment sump 201 with test gas meter 301 or other leak detection monitor specifically calibrated to the test media 61 to determine when the containment sump 201 is "full" of the test media 61. Optionally, the containment sump 201 can be checked using soap bubbles that float on top of the test media 61. Optionally, the containment sump 201 can also be checked by floating a solid on top with a specific gravity less than the test media 61.

In step 553, a negative pressure 51 may be generated within the testing apparatus 100 for a time period. In some embodiments, a pressure source 50 may be applied or otherwise coupled to the testing apparatus 100 to cause a predetermined negative pressure 51, preferably and approximately between 15 to 30 Hg of vacuum, within the conduit structure 20 of the testing apparatus 100. In further embodiments, a pressure source 50 may be coupled to the test chamber 25 and configured to generate a negative pressure 51 within the test chamber 25 that may be communicated to the underground fixture 11 via the conduit structure 20. The conduit structure 20 may be in fluid communication with the underground fixture 11 so that the negative pressure 51 may be communicated to the underground fixture 11. The predetermined negative pressure 51 may be maintained for any desired time period. In some embodiments, the conduit structure 20 may be maintained at a negative pressure 51 long enough to displace the air in the matrix 205 surrounding the exterior of the containment sump 201 that is being tested through the conduit structure 20, preferably for minimum 5 minutes. If the containment sump 201 has a leak, test media 61 will be displaced with the air into the testing apparatus 100 via the underground fixture 11.

In some embodiments, the conduit structure 20 may be coupled to the underground fixture 11 via the lower connector 28 preferably using a flexible conduit 26 long enough to place the device approximately ten to twenty feet (upwind) from the containment sump 201 being tested. The test chamber 25 may be connected to the underground fixture 11 via the conduit structure 20 and the testing apparatus 100 prepared for the test. In some embodiments and as shown in FIG. 4, a pressure source 50, such as a vacuum pump 50B, may be coupled to a drain connector 34 or other suitable coupling, of the test chamber 25 and the first valve 41 may be closed, the second valve 42 may be open, and the third valve 43 may be open. Preferably, the vent valve 33 may be closed during negative pressure 51 application and open only for sample collection. In other embodiments and as shown in FIG. 5, a pressure source 50, such as a compressor 50A or compressed gas container 50C, may be coupled to the upper connector 27 and the first valve 41 may be open, the second valve 42 may be closed, and the third valve 43 may be open with the venturi 30 providing a negative pressure 51.

In step 554, the presence of test media 61 may be tested for within the testing apparatus 100. In some embodiments, the test media 61 may be tested for at the test chamber 25 vent 32 outlet with a test gas meter 301 or other leak detection monitor specifically calibrated to the test media 61 to determine the level of potential test media 61 within the test chamber 25. In further embodiments, the test media 61 may be tested for by observing test media 61 within the test chamber 25 via one or more viewing portals 35 in the test chamber 25. For example, the test media 61 may comprise a vapor that may be illuminated by a light source, such as a laser light source, that may be directed into the test chamber 25 via one or more viewing portals 35 to allow a user to observe the test media 61 within the test chamber 25.

In some embodiments, if no test media 61 is detected, the containment sump 201 may be determined to have passed the integrity test. In further embodiments, if test media 61 is detected, the containment sump 201 may be determined to have failed the integrity test. In still further embodiments, if the containment sump 201 fails the test, restart from the preparation and begin the method 550 again. In alternative embodiments, if the containment sump 201 fails the test and if possible, restart from the preparation and perform a method for testing the integrity of containment sumps using positive pressure 700 and/or 800 (FIGS. 6-8). After step 554 the method 550 may finish 555.

Turning now to FIGS. 6-7, example methods 700 and 750, respectively, for testing the integrity of containment sumps using positive pressure 52 via a testing apparatus 100 which may be configured as shown in FIG. 8 and according to various embodiments described herein is illustrated. In this and in some embodiments, a pressure source 50, such as a compressor 50A or a compressed gas container 50C, may generate positive pressure 52 which may be supplied to the fourth conduit 24 and used to motivate a test media 61 through the underground fixture 11 and into a containment sump 201. If the test media 61 is detected in the containment sump 201, the containment sump 201 may be determined to not pass integrity testing. In further embodiments, the methods 700, 750, may comprise injecting a test media 61 of heavier than air gases and/or vapors used for testing with a positive pressure 52 into the testing apparatus 100 directly into the matrix 205 adjacent and surrounding the exterior of the containment sump 201. A measurement for the test media 61 may be conducted prior to the injection process through the testing apparatus 100 and after the injection of the test media 61 through the testing apparatus 100 into the matrix 205 surrounding the exterior walls and bottom of the containment sump 201. In addition, the testing apparatus 100 can be used to purge existing collected gases and/or vapors from the containment sump 201 prior to any integrity testing.

Referencing FIGS. 6 and 8, a block diagram of an example of a method for testing the integrity of containment sumps using positive pressure ("the method") 700 according to various embodiments described herein is presented. The method 700 may start 701 and the underground fixture 11 may be positioned proximate to containment sump 201 in step 702. In some embodiments, the underground fixture 11 may be placed in matrix 205 in close proximity, such as between 0.25 inches and ten inches, to exterior walls of the containment sump 201. In alternative embodiments, the underground fixture 11 may be an integral part of the containment sump 201 that is formed into the containment sump 201 as part of the manufacturing process.

In step 703 test media 61 may be released into the testing apparatus 100 to cause a predetermined positive pressure 52 within the testing apparatus 100. In some embodiments, step 703 may include determining which test media 61 to use and couple test gas/vapor hose or conduit (attached to pressurized test gas compressor 50A or compressed gas container 50C) to upper connector 27 preferably via a flexible conduit 26. The underground fixture 11 may be coupled to the lower connector 28 preferably using a flexible conduit 26 long enough to place the testing apparatus 100 and pressure source 50 approximately ten to twenty feet or other appropriate distance (down-wind) from the containment sump 201 being tested. The testing apparatus 100 may be prepared for the test by closing the first valve 41, opening the second valve 42, and closing the third valve 43. Preferably the test media 61 may be slowly released from pressure source 50 into the testing apparatus 100 to cause a predetermined positive pressure 52 within the testing apparatus 100. In further embodiments, appropriate positive pressure 52 may be applied from the pressure source 50 to cause a predetermined positive pressure of 30"-60" Water Column (WC). For example, pressurization can be achieved by doing one of the following: using compressed gas container 50C with the appropriate gas regulator valve; or compressor 50A with container designed to hold enough test media 61 under pressure with a valve assembly.

In step 704, the predetermined positive pressure 52 may be maintained for a desired time period. In some embodiments, the pressurized test media 61 may be maintained at a positive pressure 52 long enough to displace the air surrounding the exterior of the containment sump 201 that is being tested, preferably for minimum 5 minutes. In preferred embodiments, the pressure source 50 may apply a positive pressure 52 to the testing apparatus 100 for a desired time period to drive the test media 61 out of the ground fixture 11 and into the matrix 205 surrounding the containment sump 201. If the containment sump 201 has a leak, test media 61 will enter the containment sump 201 through the leak.

Next in step 705, the presence of test media 61 within containment sump 201 may be tested for. Preferably, the presence of test media 61 inside the containment sump 201 may be tested for with a test gas meter 301 or other leak detection monitor specifically calibrated to the test media 61 to determine the level of potential test media 61 within bottom, sides and penetration points of the containment sump 201 being tested. In some embodiments, if no test media 61 is detected, the containment sump 201 may be determined to have passed the integrity test. In further embodiments, if test media 61 is detected, the containment sump 201 may be determined to have failed the integrity test. In still further embodiments, if the containment sump 201 fails the test, restart from the preparation and begin the method 700 again. In alternative embodiments, if the containment sump 201 fails the test of method 700 and if possible, restart from the preparation and re-perform the negative pressure methods 500 or 550. After step 705 the method 700 may finish 706.

Turning now to FIG. 7, a block diagram of another example of a method for testing the integrity of containment sumps using positive pressure ("the method") 750 using a testing apparatus 100 which may be configured as shown in FIG. 8 according to various embodiments described herein is shown. The method 750 may be used for testing the integrity of a containment sump 201 that is in contact with a matrix 205 via a testing apparatus 100. The testing apparatus 100 may comprise an underground fixture 11 that may be positioned in contact the matrix 205, a test chamber 25, a conduit structure 20 providing fluid communication between the underground fixture 11 and the test chamber 25, and a pressure source 50 for exerting a positive pressure 52 that is communicated to the underground fixture 11 via the conduit structure 20. In some embodiments, the underground fixture 11 may be placed in matrix 205 in close proximity, such as between 0.25 inches and ten inches, to exterior walls of the containment sump 201. In alternative embodiments, the underground fixture 11 may be an integral part of the containment sump 201 that is formed into the containment sump 201 as part of the manufacturing process.

In some embodiments, the method 750 may start 751 and test media 61 may be released into the testing apparatus 100 to cause a predetermined positive pressure 52 within the testing apparatus 100 in step 752. In some embodiments, step 703 may include determining which test media 61 to use and couple test gas/vapor hose or conduit (attached to pressurized test gas compressor 50A or compressed gas container 50C) to upper connector 27 preferably via a flexible conduit 26. The underground fixture 11 may be coupled to the lower connector 28 preferably using a flexible conduit 26 long enough to place the testing apparatus 100 and pressure source 50 approximately ten to twenty feet or other appropriate distance (down-wind) from the containment sump 201 being tested. The testing apparatus 100 may be prepared the test by closing the first valve 41, opening the second valve 42, and closing the third valve 43. Preferably the test media 61 may be slowly released from pressure source 50 into the testing apparatus 100 to cause a predetermined positive pressure 52 within the testing apparatus 100. In further embodiments, appropriate positive pressure 52 may be applied from the pressure source 50 to cause a predetermined positive pressure of 30"-60" Water Column (WC). For example, pressurization can be achieved by doing one of the following: using compressed gas container 50C with the appropriate gas regulator valve; or compressor 50A with container designed to hold enough test media 61 under pressure with a valve assembly.

In step 753, a positive pressure 52 may be generated within the testing apparatus 100 for a time period. In some embodiments, a pressure source 50 may be applied or otherwise coupled to the testing apparatus 100 to cause a predetermined positive pressure 52, preferably and approximately between 15 to 30 Hg of pressure, within the conduit structure 20 of the testing apparatus 100. The conduit structure 20 may be in fluid communication with the underground fixture 11 so that the positive pressure 52 may be communicated to the underground fixture 11. The predetermined positive pressure 52 may be maintained for any desired time period. In some embodiments, the conduit structure 20 may be maintained at a positive pressure 52 long enough to displace the air in the matrix 205 surrounding the exterior of the containment sump 201 that is being tested through the conduit structure 20, preferably for minimum 5 minutes. If the containment sump 201 has a leak, test media 61 will be displaced with the air into the containment sump 201 from the testing apparatus 100 via the underground fixture 11 and matrix 205.

Next in step 754, the presence of test media 61 within containment sump 201 may be tested for. Preferably, the presence of test media 61 inside the containment sump 201 may be tested for with a test gas meter 301 or other leak detection monitor specifically calibrated to the test media 61 to determine the level of potential test media 61 within bottom, sides and penetration points of the containment sump 201 being tested. In some embodiments, if no test media 61 is detected, the containment sump 201 may be determined to have passed the integrity test. In further embodiments, if test media 61 is detected, the containment sump 201 may be determined to have failed the integrity test. In still further embodiments, if the containment sump 201 fails the test, restart from the preparation and begin the method 750 again. In alternative embodiments, if the containment sump 201 fails the test of method 750 and if possible, restart from the preparation and re-perform the negative pressure methods 500 or 550. After step 754 the method 750 may finish 755.

While some coupling methods have been provided, in some embodiments, one or more of the elements that comprise the testing apparatus 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the testing apparatus 100 may be coupled or removably connected by being press fit or snap fit together, by one or more fasteners such as magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the testing apparatus 100 may be coupled by being one of connected to and integrally formed with another element of the testing apparatus 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for testing the integrity of a containment sump in contact with a matrix with a testing apparatus, the testing apparatus comprising at least one underground fixture, a test chamber, a conduit structure providing fluid communication between the underground fixture and the test chamber, and a pressure source for exerting a pressure that is communicated to the underground fixture via the conduit structure, the method comprising:
   positioning the at least one underground fixture proximate to the containment sump in contact with the matrix;
   releasing a test media into the testing apparatus such that the test media enters the at least one underground fixture;
   generating a positive pressure within the testing apparatus for a time period, the positive pressure being communicated to the at least one underground fixture to force the test media out of the at least one underground fixture and into the matrix surrounding the containment sump; and
   testing for the presence of test media within the containment sump.

2. The method of claim 1, wherein the pressure source applies the positive pressure to drive the test media out of the at least one underground fixture and into the matrix.

3. The method of claim 1, wherein the conduit structure comprises a first conduit coupled to both a third conduit and to a fourth conduit and a second conduit coupled to both the third conduit and the fourth conduit, and wherein the first conduit and second conduit are coupled in parallel to each other to the third conduit and fourth conduit.

4. The method of claim 3, wherein the underground fixture is coupled to the third conduit, and wherein the test chamber is coupled to the fourth conduit.

5. The method of claim 3, wherein the pressure source is coupled to the third conduit.

6. The method of claim 1, wherein the pressure source is selected from the group consisting essentially of a compressor, a vacuum pump, and a compressed gas container.

7. The method of claim 1, wherein the conduit structure comprises a pressure reading connector.

8. The method of claim 1, wherein the conduit structure comprises a check valve.

9. The method of claim 1, wherein the test media is selected from a gas and a vapour.

* * * * *